(12) United States Patent
Murdoch et al.

(10) Patent No.: US 11,288,358 B2
(45) Date of Patent: Mar. 29, 2022

(54) ON SKIN DECENTRALIZED IDENTITY TECHNOLOGIES

(71) Applicant: Microsoft Technology Licensing, LLC., Redmond, WA (US)

(72) Inventors: Brandon Murdoch, Reading (GB); Ankur Patel, Sammamish, WA (US); Bailey Marie Bercik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 16/804,786

(22) Filed: Feb. 28, 2020

(65) Prior Publication Data

US 2021/0271750 A1 Sep. 2, 2021

(51) Int. Cl.
  *G06F 21/45* (2013.01)
  *G06F 21/34* (2013.01)
  *G06K 19/06* (2006.01)
  *H04L 29/06* (2006.01)

(52) U.S. Cl.
  CPC .............. *G06F 21/45* (2013.01); *G06F 21/34* (2013.01); *G06K 19/06037* (2013.01); *H04L 63/08* (2013.01)

(58) Field of Classification Search
  CPC ... G06F 21/45; G06F 21/34; G06K 19/06037; H04L 63/08
  USPC .......................................................... 726/6
  See application file for complete search history.

(56) References Cited

U.S. PATENT DOCUMENTS

| 10,237,256 B1* | 3/2019 | Pena ................... H04L 63/0853 |
| 2016/0005026 A1 | 1/2016 | Bouffioux |
| 2019/0230092 A1 | 7/2019 | Patel et al. |
| 2021/0160235 A1* | 5/2021 | Lerner ................... H04L 9/088 |

FOREIGN PATENT DOCUMENTS

EP 2963603 A1 1/2016

OTHER PUBLICATIONS

An introduction to decentralized identities | Azure Friday {Closed Caption Transcript} Microsoft Azure—Danny Strockis and Scott Hanselman Aug. 16, 2019 https://www.youtube.com/watch?v=r28GeXkxn0w (Year: 2019).*
"International Search Report and Written Opinion Issued in PCT Application No. PCT/US21/014044", dated Apr. 19, 2021, 14 Page.
"An Introduction to Decentralized Identities | Azure Friday", Retrieved From: https://azure.microsoft.com/en-in/resources/videos/azure-friday-an-introduction-to-decentralized-identities/, Aug. 16, 2019, 1 Page.

* cited by examiner

*Primary Examiner* — Benjamin A Kaplan
(74) *Attorney, Agent, or Firm* — Workman Nydegger

(57) ABSTRACT

Embodiments disclosed herein are related to making a determination that a wearable device that is configured to host or access a DID management module is in contact with the skin of a DID owner. A determination is then made that the DID owner is authorized to use a DID that is associated with the DID management module. Finally, one or more DID-related functions are performed using the DID that is associated with the DID management module by communicating with a second computing system that is associated with a second DID. The wearable device allows the one or more DID-related functions to be performed in a portable and secure manner.

20 Claims, 11 Drawing Sheets

ON SKIN DECENTRALIZED IDENTITY TECHNOLOGIES

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of a ledger cannot be altered retroactively without the alteration of all subsequent sections of ledger, which provides a fairly secure platform. In a broader sense, a DID further includes a DID method specifying how a client registers, replaces, rotates, and/or recovers a key. The DID method also sets a key expiration date.

Accordingly, use of a DID allows a DID owner with the ability to perform many DID-related functions using the DID. For example, the DID owner is able to create a DID and to manage the DID using a DID management module that is also known as a "digital wallet" or "user agent". Typically, the DID owner uses a computing device to implement the management module. For example, a mobile device such as a smart phone, a computing device such as a laptop computer, or the like can be used to implement the management module.

In many instances, the DID owner desires for increased portability of the DID management module (i.e., a digital wallet or user agent). Such portability allows the DID owner to use the DID management module to perform many DID-related functions without being tied down to a single or a small number of locations. In other words, the DID owner is able to use the DID that is created by and associated with the DID management module in identity operations in any location as needed.

In addition to portability, in many instances the DID owner is also concerned about increased security for use of the DID associated with the DID management module. Thus, while a mobile smart phone or the like may provide the desired portability, the mobile smart phone may not provide the increased security since the mobile smart phone may become lost or stolen and still be useable to perform many DID-related functions. Thus, a third party may be able to use the mobile smart phone that is lost or stolen to perform DID-related functions using the DID and thus the identity of the DID owner. If the third party were hostile to the DID owner, this unauthorized use the DID of the DID owner could cause many problems for the DID owner. For example, the hostile third party may open various accounts or engage in various business transactions as though he or she was the DID owner.

The principles described herein aim to solve at least some of the above-mentioned problems by providing for the use of a wearable device that is designed to either host or at least have access to the DID management module to thereby provide the desired portability since the wearable device is able to go virtually anywhere the DID owner goes. In addition, the wearable device is configured to provide a way to determine that it is in contact with the skin of the DID owner and thus being worn by the DID owner before being operable, to thereby provide the enhanced security since only the DID owner should be able to use the wearable device to access the DID management module.

In one embodiment, a determination is made that a wearable device that is configured to host or access a DID management module is in contact with the skin of a DID owner. A determination is then made that the DID owner is authorized to use a DID that is associated with the DID management module. Finally, one or more DID-related functions are performed using the DID that is associated with the DID management module by communicating with a second computing system that is associated with a second DID. The wearable device allows the one or more DID-related functions to be performed in a portable and secure manner.

In some embodiments, the wearable device is one of a watch, a ring, a bracelet or a necklace. In other embodiments, the wearable device shuts off when it is determined that the skin of the DID owner is no longer in contact with the wearable device.

In some embodiments performing one or more DID-related functions comprises accessing one or more signed attestations that include information about the DID owner and providing the one or more signed attestations to the second computing system as a visual representation of the one or more signed attestations.

In some embodiments performing one or more functions comprises presenting to an interface of the second computing system a QR code and providing a visual representation of the DID associated with the management module. The QR code may be presented to the second computing system by a third computing system. The visual representation may be viewable on the third computing system.

In some embodiments performing one or more functions comprises providing a request for a service to the second computing system, receiving a request for authentication data, and providing the authentication data to the second computing system.

In some embodiments determining that the DID owner is authorized to use a DID comprises receiving information that identifies the DID owner. The information may be one of a username and password or biometric information. The information that identifies the user may be received from a third computing system.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope. Embodiments will be described and explained with additional specificity and details through the use of the accompanying drawings in which.

DETAILED DESCRIPTION

Embodiments disclosed herein are related to making a determination that a wearable device that is configured to host or access a DID management module is in contact with the skin of a DID owner. A determination is then made that the DID owner is authorized to use a DID that is associated with the DID management module. Finally, one or more DID-related functions are performed using the DID that is associated with the DID management module by communicating with a second computing system that is associated with a second DID. The wearable device allows the one or more DID-related functions to be performed in a portable and secure manner.

Because the principles described herein may be performed in the context of a computing system, some introductory discussion of a computing system will be described with respect to FIG. 1. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
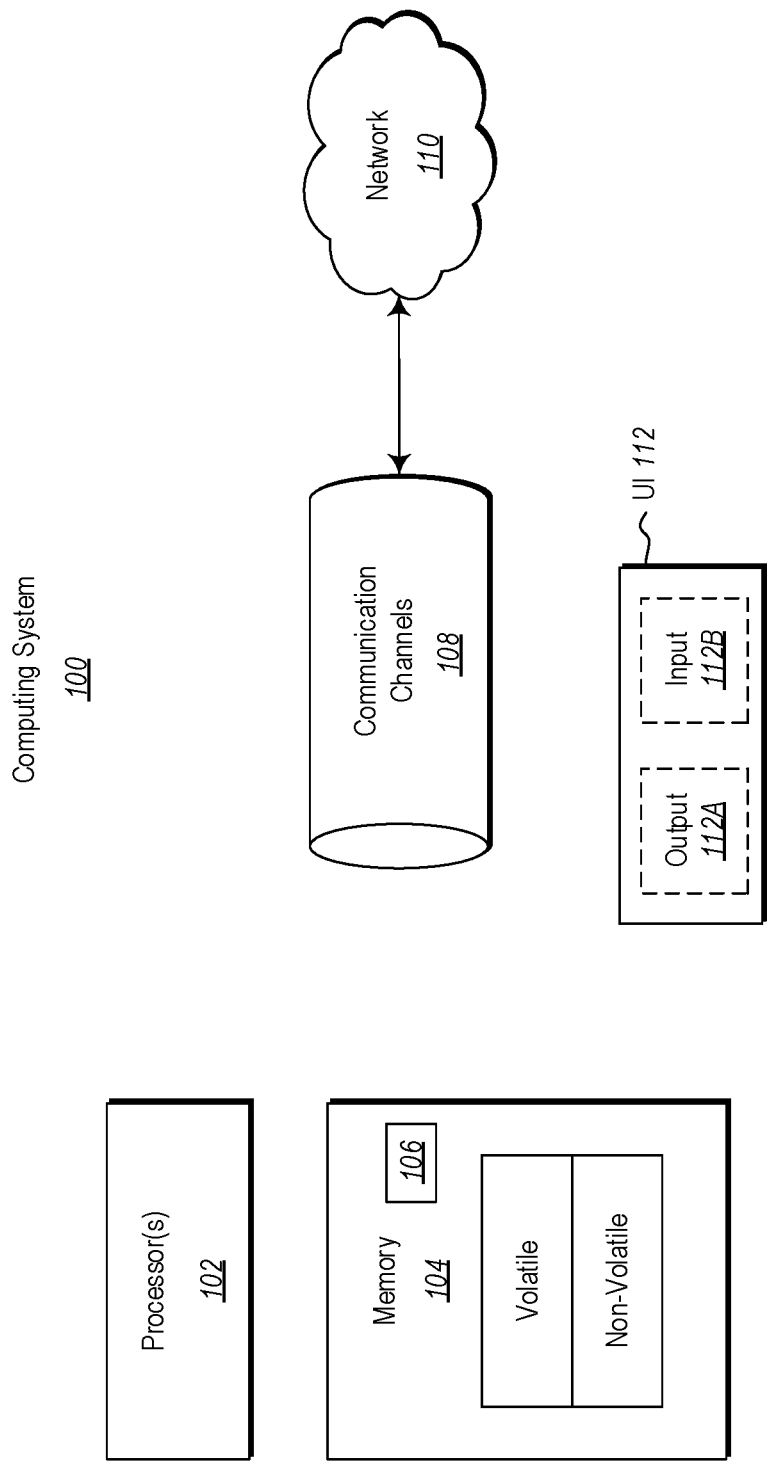
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 includes a general-purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" is also used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component includes software objects, routines, methods, and so forth, that are executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure are computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) are stored in the memory 104 of the computing system 100. Computing system 100 also contains communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which correspond to the computing system 100 previously described. The computing systems of the remaining figures include various components or functional blocks that implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 2:
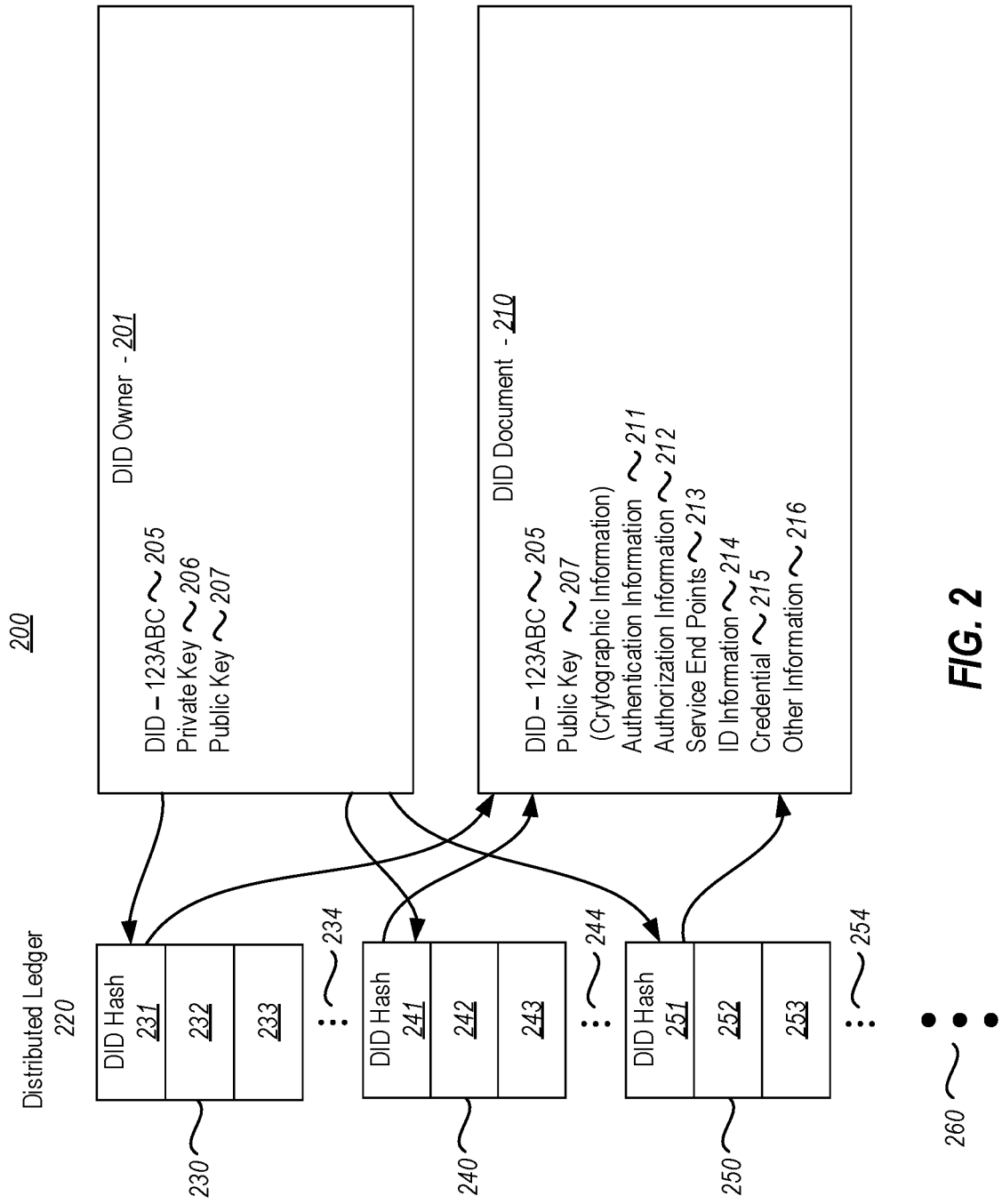
FIG. 2 illustrates an example environment for creating a decentralized identification (DID)

Some introductory discussion of a decentralized identifier (DID) and the environment in which they are created and reside will now be given with respect to FIG. 2, which illustrates portions of a decentralized network 200. As illustrated in FIG. 2, a DID owner 201 owns or otherwise controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 may be a human being or an organization of human beings. Such organizations might include a company, department, government, agency, or any other organization or group of organizations. Each individual human being might have a DID while the organization(s) to which each belongs might likewise have a DID.

The DID owner 201 may alternatively be a machine, system, or device, or a collection of machines, devices and/or systems. In still other embodiments, the DID owner 201 may be a subpart of a machine, system or device. For instance, a device could be a printed circuit board, where the subparts of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 is an artificial intelligence. Accordingly, an artificial intelligence may also own a DID.

Thus, the DID owner 201 is any entity, human or non-human, that is capable of creating the DID 205 or at least having the DID 205 created for and/or associated with them. Although the DID owner 201 is shown as having a single DID 205, this need not be the case as there may be any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource identifier (URI) (such as a Uniform Resource Locator (URL)) or other pointer that relates the DID owner 201 to mechanisms to engage in trustable interactions with the DID owner 201.

The DID 205 is "decentralized" because it does not require a centralized, third-party management system for generation, management, or use. Accordingly, the DID 205 remains under the control of the DID owner 201. This is different from conventional centralized IDs which base trust on centralized authorities and that remain under control of corporate directory services, certificate authorities, domain name registries, or other centralized authority (referred to collectively as "centralized authorities" herein). Accordingly, the DID 205 is any identifier that is under the control of the DID owner 201 and that is independent of any centralized authority.

In some embodiments, the structure of the DID 205 is as simple as a username or some other human-understandable term. However, in other embodiments, for increased security, the DID 205 is preferably a random string of numbers and letters. In one embodiment, the DID 205 is a string of 128 numbers and letters. Accordingly, the embodiments disclosed herein are not dependent on any specific implementation of the DID 205. In a very simple example, the DID 205 is shown within the figures as "123ABC".

As also shown in FIG. 2, the DID owner 201 has control of a private key 206 and public key 207 pair that is associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair are generated on a device controlled by the DID owner 201. The private key 206 and public key 207 pair should not be generated on a server controlled by any centralized authority as this causes the private key 206 and public key 207 pair to not be fully under the control of the DID owner 201 at all times. Although FIG. 2 and this description have described a private and public key pair, it will also be noted that other types of reasonable cryptographic information and/or mechanisms are also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 (such as blockchain) that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 is also used to verify that the DID owner 201 in fact owns or controls the DID 205.

The DID document 210 includes authentication information 211. The authentication information 211 specifies one or more mechanisms by which the DID owner 201 is able to prove that the DID owner 201 owns the DID 205. In other words, the mechanisms of the authentication information 211 show proof of a binding between the DID 205 (and thus its DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third-party entities the rights to modify the DID document 210 or some part of the document without giving the third-party the right to prove ownership of the DID 205. For example, the authorization information 212 allows the third-party entity to update any designated set of one or more fields in the DID document 210 using any designated update mechanism. Alternatively, the authorization information allows the third-party to limit the usages of DID 205 by the DID owner 201 for a specified time period. This is useful when the DID owner 201 is a minor child and the third-party is a parent or guardian of the child. The authorization information 212 allows the parent or guardian to limit use of the DID owner 201 until such time as the child is no longer a minor.

The authorization information 212 also specifies one or more mechanisms that the third-party will need to follow to prove they are authorized to modify the DID document 210. In some embodiments, these mechanisms are similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable attestation or claim repository services. Accordingly, the service endpoints 213 operate as pointers for the services that operate on behalf of the DID owner 201. These pointers are used by the DID owner 201 or by third-party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes.

A persona may be pseudo anonymous. As an example, the DID owner 201 may include a pen name in the DID document when identifying him or her as a writer posting articles on a blog. A persona may be fully anonymous. As an example, the DID owner 201 may only want to disclose his or her job title or other background data (e.g., a schoolteacher, an FBI agent, an adult older than 21 years old, etc.) but not his or her name in the DID document. As yet another example, a persona may be specific to who the DID owner 201 is as an individual. As an example, the DID owner 201 may include information identifying him or her as a volunteer for a particular charity organization, an employee of a particular corporation, an award winner of a particular award, and so forth.

The DID document 210 also includes attestation information 215. The attestation information 215 is any information that is associated with the DID owner 201's background. For instance, the attestation information 215 is (but not limited to) a qualification, an achievement, a government ID, a government right such as a passport or a driver's license, a payment provider or bank account, a university degree or other educational history, employment status and history, or any other information about the DID owner 201's background. In some embodiments, the DID owner 201 collects various signed attestations (also sometimes referred as verifiable claims or verifiable credentials) that are included in the attestation information from different third-party entities.

The DID document 210 includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger 220 operates according to known standards or methods for distributed ledgers. Examples of conventional distributed ledgers that correspond to the distributed ledger 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actual distributed ledger. Alternatively, in other embodiments the DID document 210 is stored in a data storage (not illustrated) that is associated with the distributed ledger 220.

As mentioned, a representation of the DID 205 is stored on each distributed computing system of the distributed ledger 220. For example, in FIG. 2 this is shown as DID hash 231, DID hash 241, and DID hash 251, which are ideally identical hashed copies of the same DID. The DID hash 231, DID hash 241, and DID hash 251 point to the location of the DID document 210. The distributed ledger or blockchain 220 also stores numerous other representations of other DIDs as illustrated by references 232, 233, 234, 242, 243, 244, 252, 253, and 254.

In one embodiment, when the DID owner 201 creates the DID 205 and the associated DID document 210, the DID hash 231, DID hash 241, and DID hash 251 are written to the distributed ledger 220. The distributed ledger 220 thus records that the DID 205 now exists. Since the distributed ledger 220 is decentralized, the DID 205 is not under the control of any entity outside of the DID owner 201. DID hash 231, DID hash 241, and DID hash 251 each include, in addition to the pointer to the DID document 210, a record or time stamp that specifies when the DID 205 was created. At a later date, when modifications are made to the DID document 210, each modification (and potentially also a timestamp of the modification) is also recorded in DID hash 231, DID hash 241, and DID hash 251. DID hash 231, DID hash 241, and DID hash 251 further include a copy of the public key 207 so that the DID 205 is cryptographically bound to the DID document 210.

Figure 3:
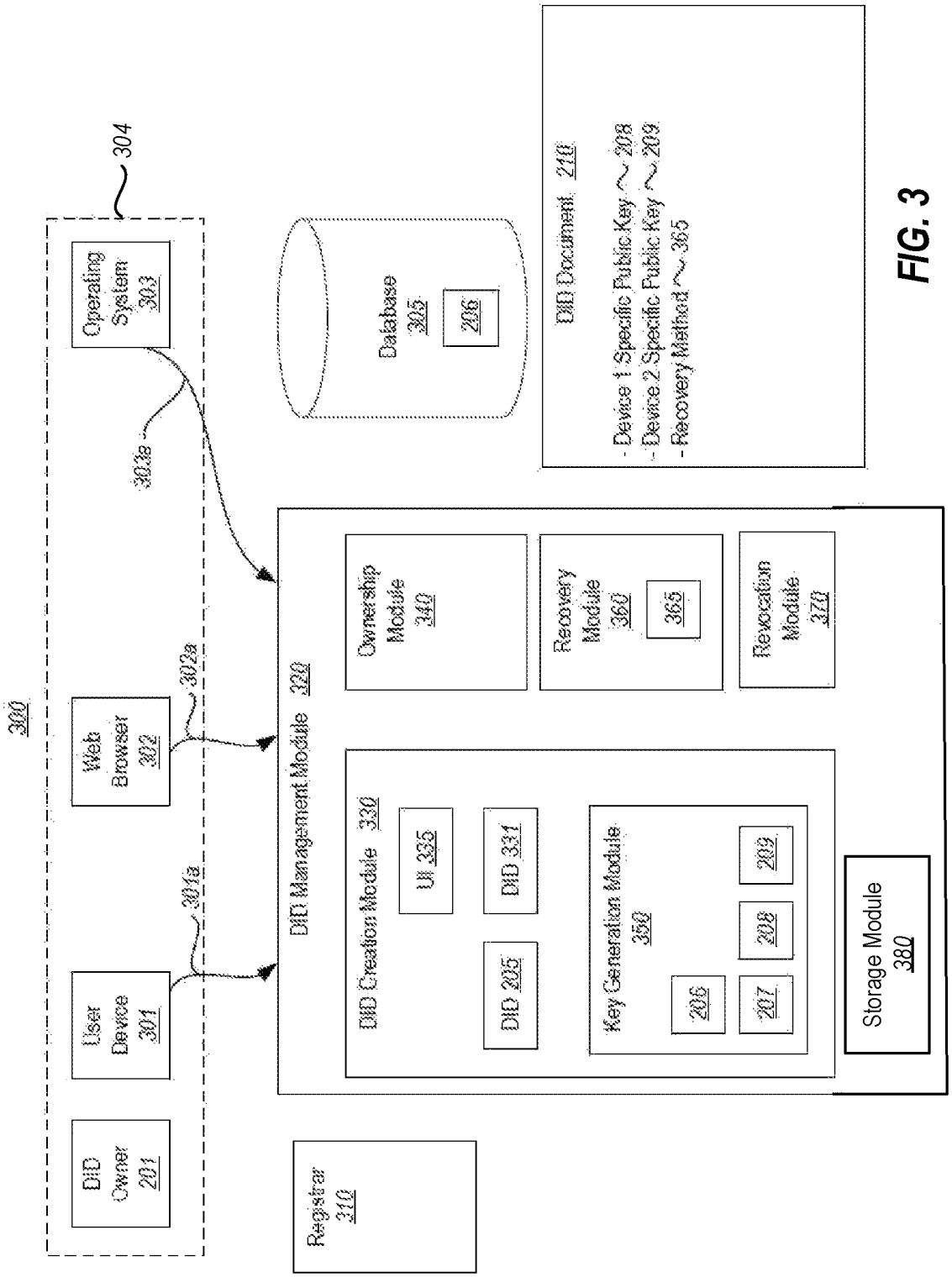
FIG. 3 illustrates an example environment for various DID management operations and services.

Having described DIDs and how they operate generally with reference to FIG. 2, specific embodiments of DID environments will now be explained. Turning to FIG. 3, a computing system environment 300 that is used to perform various DID management operations and services will now be explained. It will be appreciated that the environment of FIG. 3 reference elements from FIG. 2 as needed for ease of explanation.

As shown in FIG. 3, the environment 300 includes various devices and computing systems that are owned or otherwise under the control of the DID owner 201. These include a user device 301. The user device 301 is, but is not limited to, a mobile device such as a smart phone, a computing device such as a laptop computer, or any device such as a car or an appliance that includes computing abilities. The device 301 includes a web browser 302 operating on the device and an operating system 303 operating the device. More broadly speaking, the dashed line 304 represents that all of these devices are owned or otherwise under the control of the DID owner 201.

The environment 300 also includes a DID management module 320. It will be noted that in operation, the DID management module 320 resides on and is executed by one or more of user device 301, web browser 302, and the operating system 303 as illustrated by respective lines 301a, 302a, and 303a. Accordingly, the DID management module 320 is shown as being separate for ease of explanation. In some embodiments, the management module 320 is referred to as a "digital wallet" or a "user agent".

As shown in FIG. 3, the DID management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guides the DID owner 201 in creating the DID 205. The DID creation module 330 has one or more drivers that are configured to work with specific distributed ledgers such as distributed ledger 220 so that the DID 205 complies with the underlying methods of that distributed ledger.

A specific embodiment will now be described. For example, the UI 335 prompt for the user to enter a username or some other human recognizable name. This name is used as a display name for the DID 205 that will be generated. As previously described, the DID 205 is a long string of random numbers and letters and so having a human-recognizable name for a display name is advantageous. The DID creation module 330 then generates the DID 205. In the embodiments having the UI 335, the DID 205 is shown in a listing of identities and is associated with the human-recognizable name.

The DID creation module 330 also included a key generation module 350. The key generation module generates the private key 206 and public key 207 pair previously described. The DID creation module 330 uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process uses the public key 207 in the hash generation.

In some embodiments, the DID management module 320 includes an ownership module 340. The ownership module 340 provides mechanisms that ensure that the DID owner 201 is in sole control of the DID 205. In this way, the provider of the DID management module 320 is able to ensure that the provider does not control the DID 205 but is only providing the management services.

As previously discussed, the key generation module 350 generates the private key 206 and public key 207 pair and the public key 207 is then recorded in the DID document 210. Accordingly, the public key 207 is usable by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205, which update would be reflected in a transaction on the distributed ledger 220, as previously described.

In some embodiments, however, it is advantageous to have a public key per device 301 owned by the DID owner 201 as this allows the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 generates additional public keys 208 and 209 when the additional devices execute the DID creation module 330. These additional public keys are associated with the private key 206 or in some instances are paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID document 210 often includes the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 often desires to keep secret the association of a device with a public key or the association of a device with the DID 205. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 generates an additional DID, for example DID 331, for each device. The DID creation module 330 then generates private and public key pairs and DID documents for each of the devices and has them recorded on the distributed ledger 220 in the manner previously described. Such embodiments are advantageous for devices that change ownership as it is possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, browser 302, or operating system 303 that is owned or controlled by the DID owner 201 that executed the DID management module 320. In this way, there is little chance that of a third-party (and most consequentially, the provider of the DID management module 320) gaining control of the private key 206.

However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. As an example, the database 305 is one of the identity hubs 410 described below with respect to FIG. 4. A storage module 380 is configured to store data (such as the private key 206 or the attestation information 215 made by or about the DID owner 201) off device in the database 305 or in the identity hubs 410 that will be described in more detail to follow. Of course, in some embodiments the storage module 380 stores at least some data on the device if the device has sufficient storage resources. In some embodiments, the private key 206 is stored as a QR code that is scanned by the DID owner 201.

In other embodiments, the DID management module 320 includes a recovery module 360 that is used to recover a lost private key 206. In operation, the recovery module 360 allows the DID owner 201 to select one or more recovery mechanisms 365 at the time the DID 205 is created that are later used to recover the lost private key. In those embodiments having the UI 335, the UI 335 allows the DID owner 201 to provide information that will be used by the one or more recovery mechanisms 365 during recovery. The recovery module 360 run on any device associated with the DID 205.

The DID management module 320 also included a revocation module 370 that is used to revoke or sever a device from the DID 205. In operation, the revocation module uses the UI element 335, which allows the DID owner 201 to indicate a desire to remove a device from being associated with the DID 205. In one embodiment, the revocation module 370 accesses the DID document 210 and causes all references to the device to be removed from the DID document 210. Alternatively, the public key for the device is removed. This change in the DID document 210 is then reflected as an updated transaction on the distributed ledger 220 as previously described.

Figure 4:
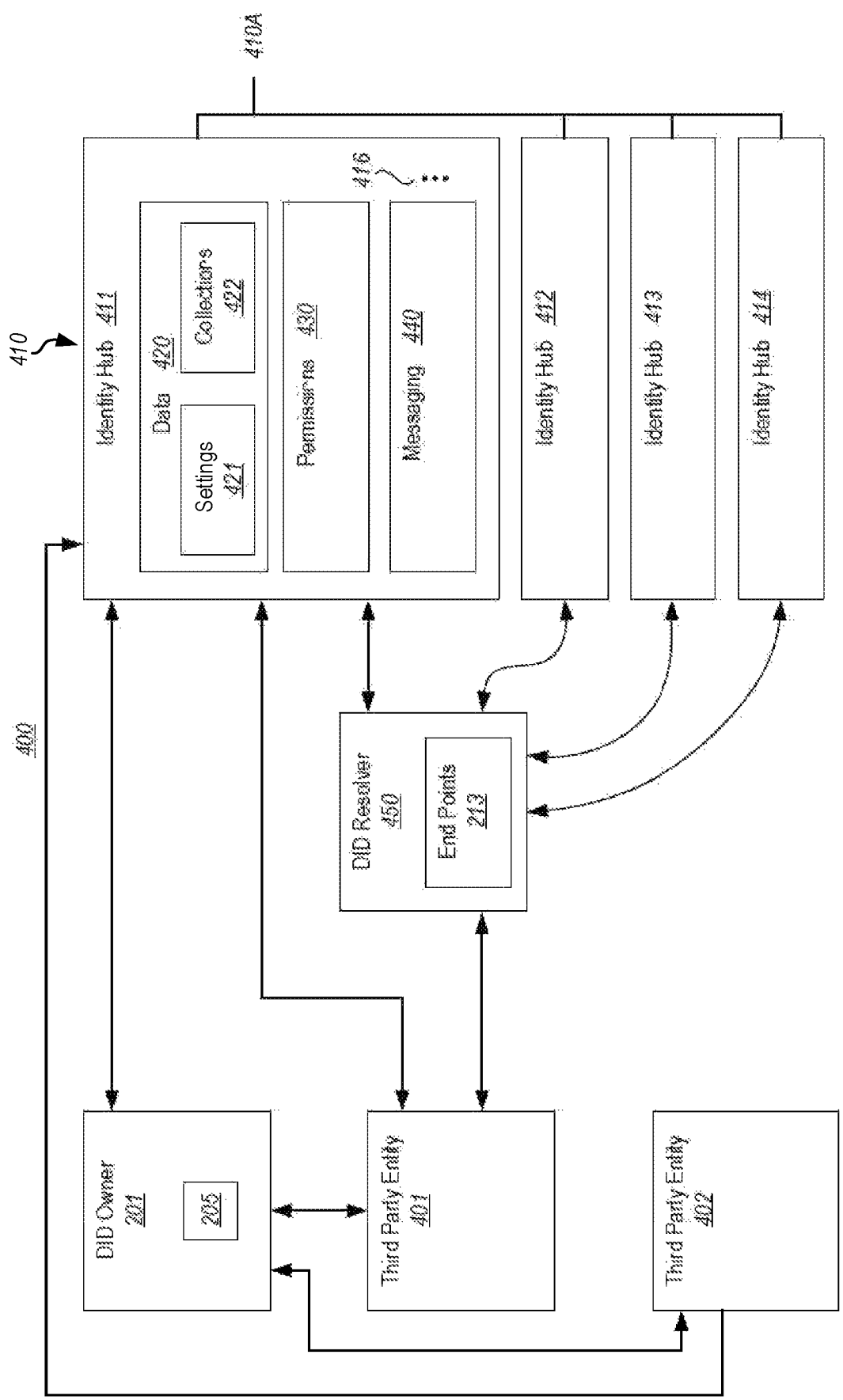
FIG. 4 illustrates an example decentralized storage device or identity hubs.

FIG. 4 illustrates an embodiment of a computing system environment 400 in which a DID such as DID 205 is utilized. Specifically, the environment 400 is used to describe the use of the DID 205 in relation to one or more decentralized stores or identity hubs 410 that are each under the control of the DID owner 201 to store data belonging to or regarding the DID owner 201. For instance, data is stored within the identity hubs using the storage module 380 of FIG. 3. It will be noted that FIG. 4 includes references to elements first discussed in relation to FIG. 2 or 3 and thus uses the same reference numeral for ease of explanation.

In one embodiment, the identity hubs 410 is multiple instances of the same identity hub. This is represented by the line 410A. Thus, the various identity hubs 410 include at least some of the same data and services. Accordingly, if a change is made to part of at least some of the data (and potentially any part of any of the data) in one of the identity hubs 410, the change is reflected in one or more of (and perhaps all of) the remaining identity hubs.

The identity hubs 410 may be any data store that is in the exclusive control of the DID owner 201. As an example only, the first identity hub 411 and second identity hub 412 are implemented in cloud storage (perhaps within the same cloud, or even on different clouds managed by different cloud providers) and thus are able to hold a large amount of data. Accordingly, a full set of the data is storable in these identity hubs.

However, the identity hubs 413 and 414 may have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412 through 414. As illustrated, identity hub 411 includes data storage 420. The data storage 420 is used to store any type of data that is associated with the DID owner 201. In one embodiment the data is a collection 422 of a specific type of data corresponding to a specific protocol. For example, the collection 422 may be medical records data that corresponds to a specific protocol for medical data. The collection 422 also includes other types of data, such as attestations 215 made by or about the DID owner 201.

In one embodiment, the stored data has different authentication and privacy settings 421 associated with the stored data. For example, a first subset of the data has a setting 421 that allows the data to be publicly exposed, but that does not include any authentication to the DID owner 201. This type of data is typically for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 are able to decrypt this data. With respect to data stored by the storage module 380, these settings 411 are at least partially composed by the storage module 380 of FIG. 3.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 is able to give permission to any number of third parties to access a subset of the data 420. This will be explained in more detail to follow. With respect to data stored by the storage module 380, these access permissions 430 are at least partially composed by the storage module 380 of FIG. 3.

The identity hub 411 also include a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 wishes to authenticate a new device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 is not able to initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 searches the distributed ledger 220 using the DID 205, which should result in the DID resolver 450 finding the DID document 210. The DID document 210 is then provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge is structured such that only a device having access to the private key 206 will be able to successfully answer the challenge.

In this embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provides the DID 205 to the third-party entity 401 so that the third-party is able to access data or services stored on the identity hub 411. For example, the DID owner 201 is a human who is at a scientific conference who desires to allow the third-party 401, who is also a human, access to his or her research data. Accordingly, the DID owner 201 provides the DID 205 to the third-party 401.

Once the third-party 401 has access to the DID 205, he or she accesses the DID resolver 450 to access the DID document 210. As previously discussed, the DID document 210 includes an end point 213 that is an address or pointer to services associated with the decentralized identity.

Completing the research data example, the third-party 401 sends a message to the messaging module 440 asking for permission to access the research data. The messaging module 440 sends a message to the DID owner 201 asking if the third-party 401 should be given access to the research data. Because the DID owner desires to provide access to this data, the DID owner 201 allows permission to the third-party 401 and this permission is recorded in the permissions 430.

The messaging module 440 then messages the third-party 401 informing the third-party that he or she is able to access the research data. The identity hub 411 and the third-party 401 directly communicate so that the third-party is able to access the data. It will be noted that in many cases, it will actually be an identity hub associated with the third-party 401 that communicates with the identity hub 411. However, it may be a device of the third-party 401 that does the communication.

Advantageously, the above described process allows the identity hub 411 and the third-party 401 to communicate and to share the data without the need for the third-party to access the identity hub 411 in the conventional manner. Rather, the communication is provisioned in the decentralized manner using the DID 205 and the DID document 210. This advantageously allows the DID owner to be in full control of the process.

As shown in FIG. 4, the third-party 402 also requests permission for access to the identity hub 411 using the DID 205 and the DID document 210. Accordingly, the embodiments disclosed herein allow access to any number of third parties to the identity hubs 410.

In many instances, the DID owner 201 desires for increased portability of the DID management module 320 (i.e., a digital wallet or user agent). Such portability allows the DID owner 201 to use the DID management module 320 to perform many DID-related functions as will be explained in more detail to follow. In other words, the DID owner 201 is able to use the DID 205 in identity operations in any location as needed.

In addition to portability, in many instances the DID owner 201 is also concerned about increased security for use of the DID 205. Thus, while a mobile phone or the like may provide the desired portability, the mobile phone may not provide the enhanced security since the phone may become lost or stolen and still be useable to perform many DID related functions. Accordingly, the embodiments disclosed herein provide for the use of a wearable device that is designed to either host or at least have access to the DID management module 320 to thereby provide the desired portability. In addition, the wearable device is configured to provide a way to determine that it is in contact with the DID owner 201 before being operable, to thereby provide the enhanced security.

Figure 5A:
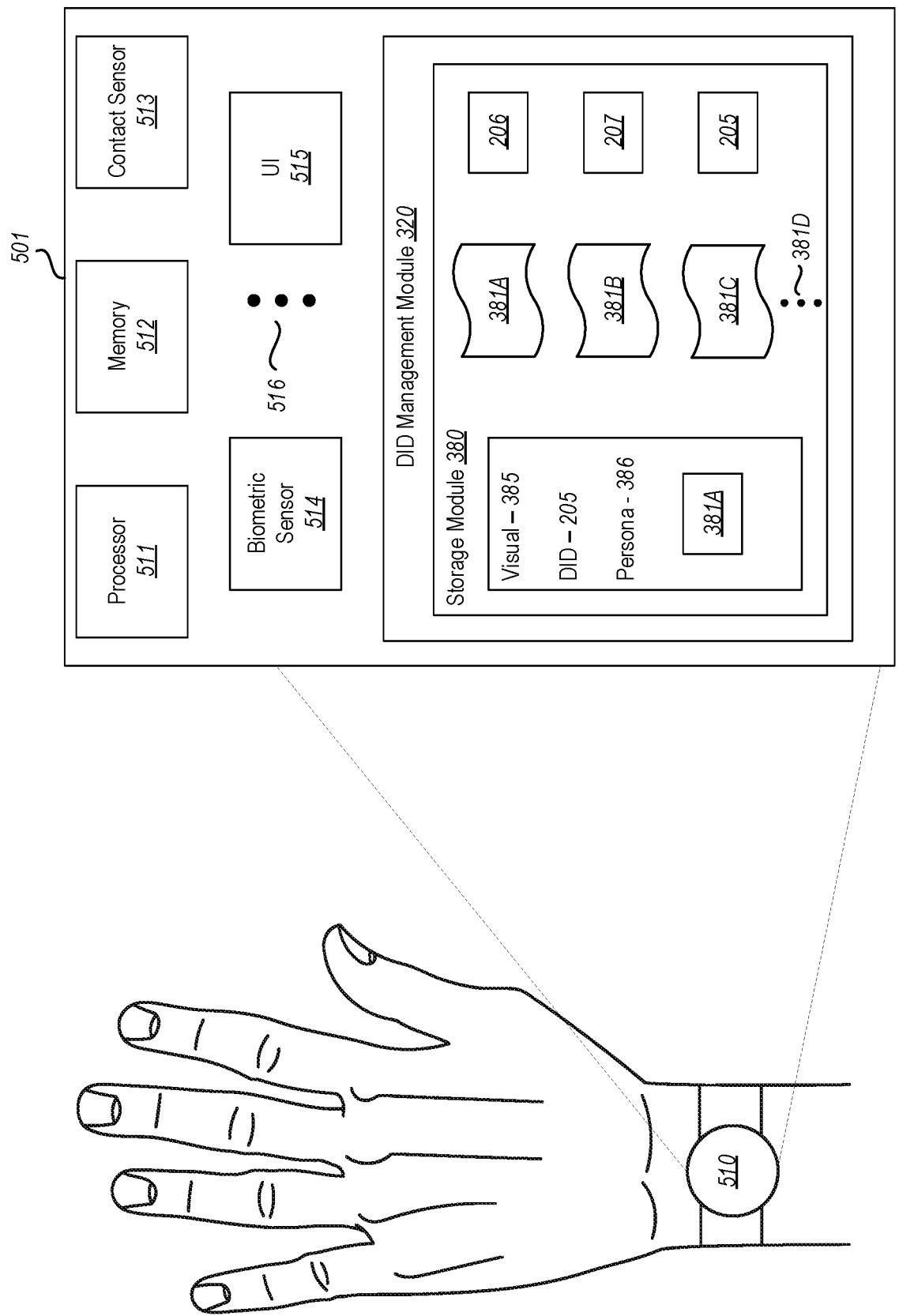
FIGS. 5A-5D illustrate example embodiments of a wearable device.

Attention is now made to FIG. 5A, which illustrates on embodiment of a wearable device 510. In the embodiment, the wearable device 510 is a smart watch. However, the wearable device may also be a bracelet 530, a necklace 540 (see FIG. 5C), or any other wearable device. As shown at 501, the wearable device 510 includes a processor 511 and memory 512 that may correspond to the processor 102 and memory 104 discussed previously.

In addition, the wearable device 510 includes a contact sensor 513. In operation, the contact sensor 513 is configured to detect contact between the wearable device 510 and the skin of DID owner 201 when the DID owner 201 is wearing the wearable device 510. The wearable device 510 also includes a biometric sensor 514. In operation, the biometric sensor 514 is configured to receive biometric input from the DID owner 201 such as a temperature reading, a fingerprint, a retinal scan, or the like that provide evidence that it is the DID owner 201 that is actually wearing the wearable device 510. The wearable device 510 also includes a user interface (UI) 515 that may include a screen for viewing and a physical or digital keyboard for entering data. Thus, the UI 515 is configured to allow the DID owner 201 to interact with the wearable device 501. Finally, the wearable device 510 may also include further sensors and other hardware as illustrated by ellipses 516.

As also illustrated at 501, the wearable device 510 is configured to host the DID management module 320 in the memory 512. Alternatively, in some embodiments the wearable device 510 does not directly host the DID management module 320, but rather is able to access the DID management module 320 that is implemented on another computing system such as the user device 301. As discussed previously, the DID management module 320 is associated with the DID 205 that is owned or controlled by the DID owner 201.

As also discussed previously, the DID management module 320 includes the storage module 380, which is configured to store data such as the attestation information 215 and/or the private and public key pair 206 and 207 on the wearable device (i.e., in the memory 512) or to allow the data to be accessed from the database 305 and/or one of the identity hubs 410. In the illustrated embodiment, the attestation information 215 may be implemented as a signed attestation 381A, a signed attestation 381B, a signed attestation 381C, and any number of additional signed attestations as illustrated by the ellipses 381D. The signed attestations 381A-381D may be a qualification, an achievement, a government ID, a government right such as a passport or a driver's license, a payment provider or bank account, a university degree or other educational history, employment status and history, or any other information about the DID owner 201's background.

In some embodiments, the DID management module 320 is configured to generate a visual element 385 that is configured to show a visual representation of one or more of the signed attestations 381A-381D. The visual representation provides a way for visually organizing the signed attestations 381A-381D in a way that is easy for the DID owner 201 and other human users to read and understand. For example, if the signed attestation 381A, which is shown as being included in the visual element 385, was a driver's license issued by a government agency, then the visual element 385 would show the driver's license in a manner that would be recognizable as a driver's license to a human or computing system reading the visual element 385.

In addition, the visual element 385 may also show the DID 205 and a persona 386. The persona 386 defines an identity that the DID owner 201 wishes to represent him or herself to a third party that will view the visual element 385. For example, the persona 386 may be the DID owner's real name and may include other identifying information such as a home address, work title, educational achievement, or the like. This type of persona is useful when the DID owner 201 is performing DID-related functions with a party that would need to know his or her true identity such as a car rental agency when renting a car. In other embodiments, the persona 386 may be a pseudo-anonymous persona that only includes a small amount of (or even no) personally identifiable information. Such personas are useful when the DID owner 201 does not desire his or her true identity to be known when performing a DID-related function.

During an initial use of the wearable device 510, the DID owner 201 puts on the wearable device 510 and the contact sensor 513 determines that the wearable device is in contact with the skin of the DID owner 201. Since the DID owner has not previously worn the wearable device 510 or is putting it on after a period of not wearing it, the processor 511 determines if the DID owner 201 is authorized to use the DID 205 that is associated with the DID management module 320 by receiving information that identifies the DID owner 201. In one embodiment, the DID owner uses the UI 515 to enter a username and password, which are examples of information that identifies the DID owner 201, to verify that the DID owner 201 is authorized to use the DID 205. In other embodiments, the DID owner 201 uses the biometric sensor 514 to enter biometric information, which is an example of information that identifies the DID owner 201, such as a fingerprint or a retinal scan to verify that the DID owner 201 is authorized to use the DID 205. If the username and password and/or the biometric information is recognized by the wearable device 510, the DID owner 210 is given authorization to use the DID 205 in various DID-related functions as will be explained in more detail to follow.

As long as the DID owner 201 continues to wear the wearable device 510, contact will be maintained with the skin of the DID owner 201 and the wearable device is able to operate. However, when the DID owner 201 removes the wearable device so that the contact sensor 513 no longer senses contact with the skin of the DID owner 201, the processor 511 will shut off the wearable device 510 as a security measure so that no unauthorized party is able to use the DID 205 in any DID-related functions. Thus, if the wearable device 510 is stolen or lost, it should not be useable by a third party. At a later time, when the DID owner 201 puts the wearable device 510 back on so that contact sensor 513 once again senses contact with the skin of the DID owner 201, the authorization process is repeated to ensure that it is the DID owner 201 who is wearing the wearable device 510.

Figure 5B:
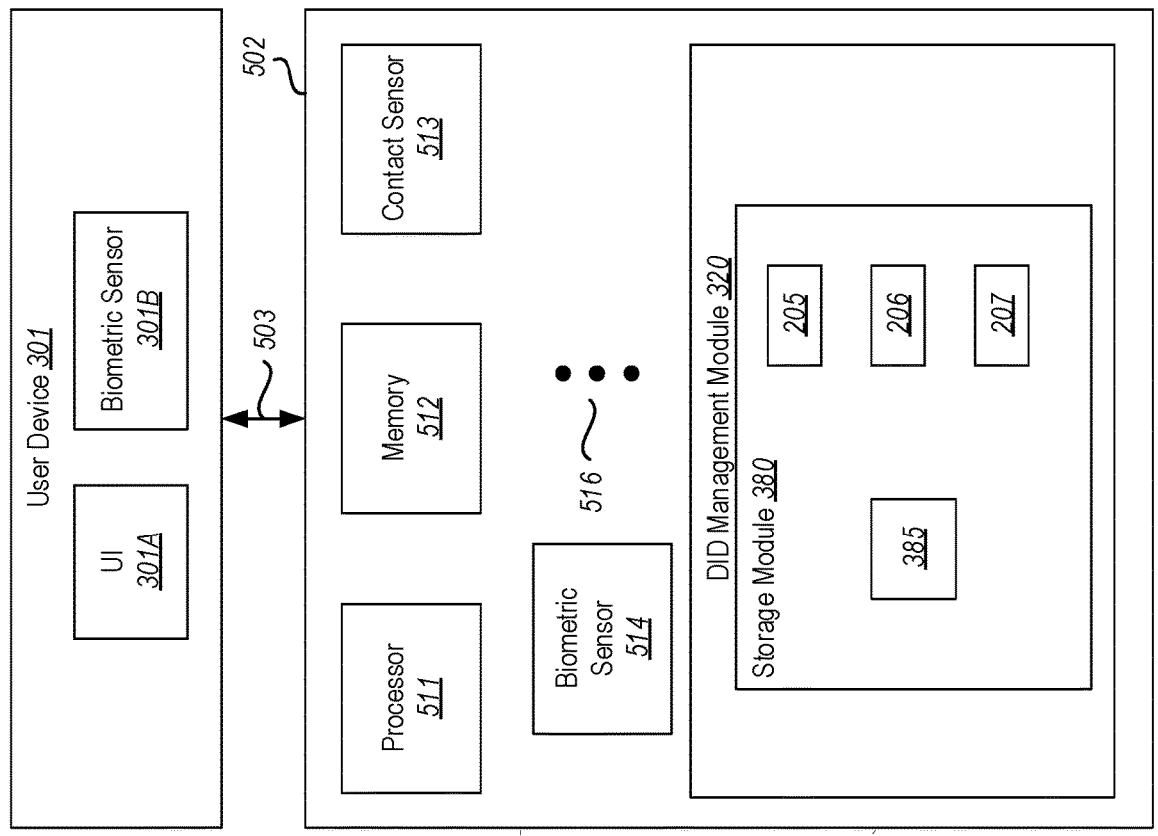
Figure 5B:
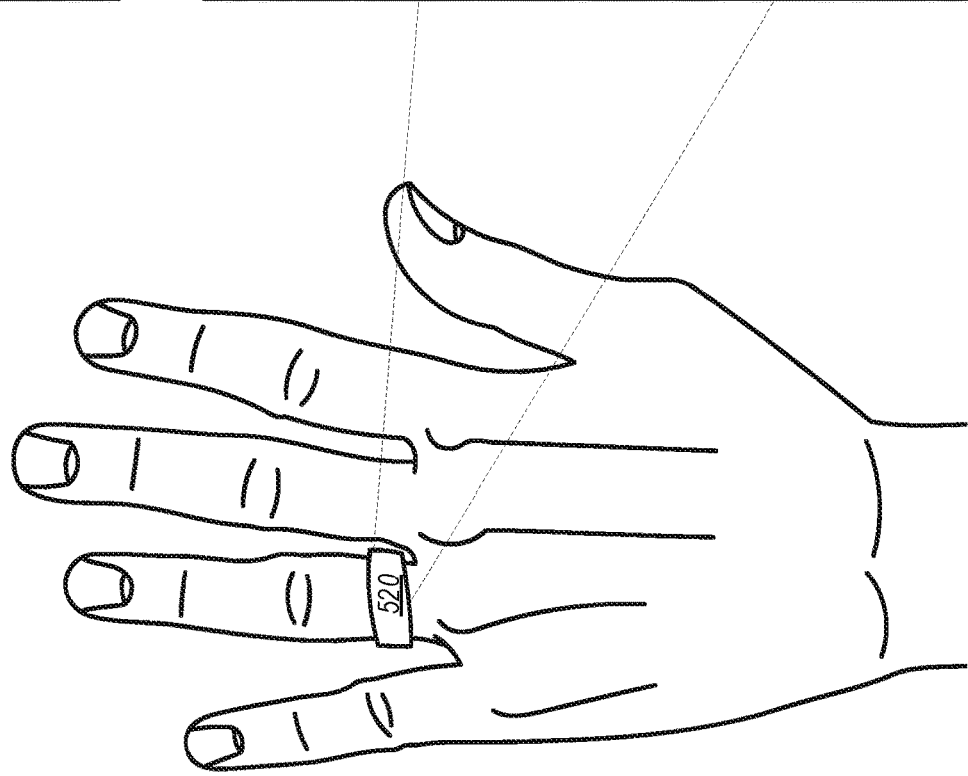
Figure 5D:
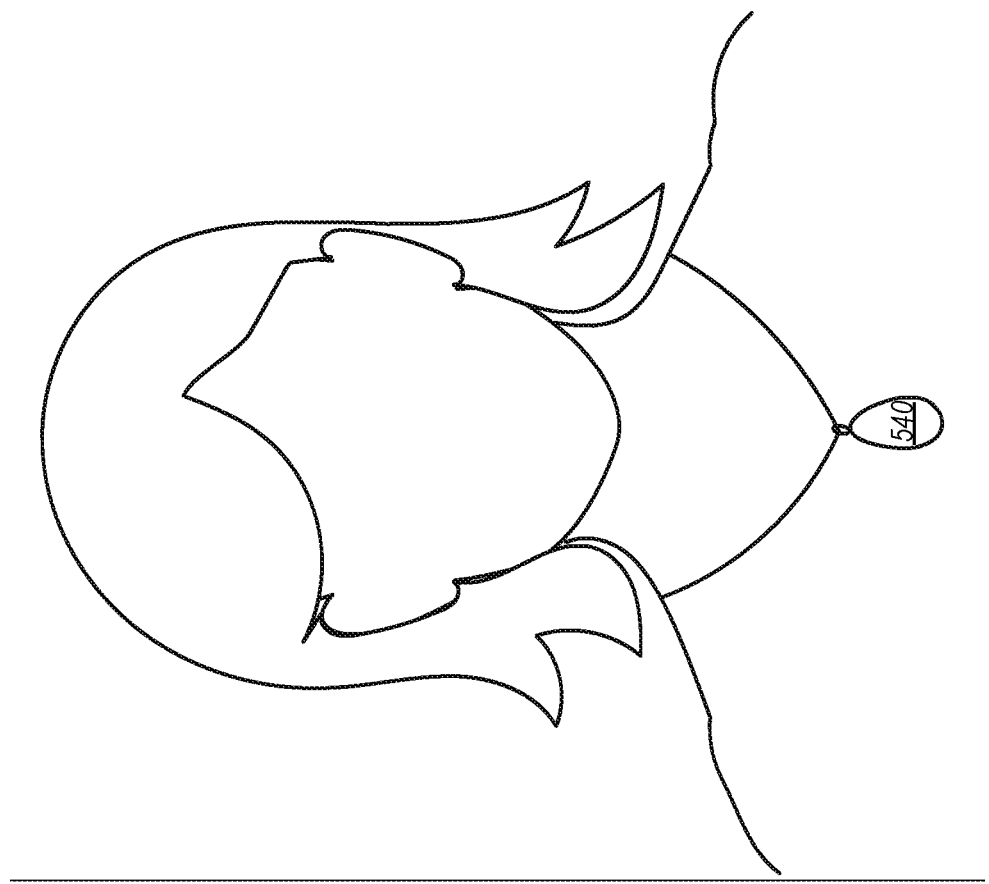

Attention is now made to FIG. 5B, which illustrates on embodiment of a wearable device 520. In the embodiment, the wearable device 520 is a smart ring. However, the wearable device may also be a bracelet 530, a necklace 540 (see FIG. 5C), or any other wearable device. As shown at 502, the wearable device 520 includes the processor 511 and memory 512 that may correspond to the processor 102 and memory 104 discussed previously, the contact sensor 513, the biometric sensor 514, and the further sensors and other hardware as illustrated by ellipses 516. Since these elements were discussed in relation to FIG. 5A, these elements need not be further discussed in relation to FIG. 5B.

As also illustrated at 502, the wearable device 510 is configured to host the DID management module 320 in the memory 512. Alternatively, in some embodiments the wearable device 510 does not directly host the DID management module 320, but rather is able to access DID management module 320 that is implemented on another computing system such as the user device 301. As previously discussed in relation to FIG. 5A, the DID management module 320 includes the storage module 380, which is configured to store data such as the attestation information 215 (e.g., the signed attestations 381A-381D) and/or the private and public key pair 206 and 207 on the wearable device (i.e., in the memory 512) or to allow the data to be accessed from the database 305 and/or one of the identity hubs 410. The storage module 380 also includes the visual element 385. Since these elements were discussed in relation to FIG. 5A, these elements need not be further discussed in relation to FIG. 5B.

As shown in FIG. 5B, the wearable device 530 does not typically include the UI 515. Since a smart ring or the like is typically small, there is usually not enough space to implement a UI that includes a screen and an input like a keyboard or digital keyboard for inputting data. Accordingly, in the embodiment the wearable device 520 is configured to utilize a UI 301A of a user device 301 such as a smart phone that may include a screen for viewing and a physical or digital keyboard for entering data as shown at 503. Accordingly, when the DID owner 201 first puts on the wearable device 520 and the contact sensor 513 detects contact with the skin of the DID owner, the DID owner 201 uses the UI 301A to enter the username and password as needed during the authorization process. In some embodiments, the user device 301 includes a biometric sensor 301B that is used by the DID owner 201 during the authorization process in instances that the biometric sensor 514 is unable to provide the required biometric information. As will be explained in more detail to follow, the wearable device 520 also utilizes the UI 301A of the user device 301 when performing various DID-related functions.

Figure 5C:
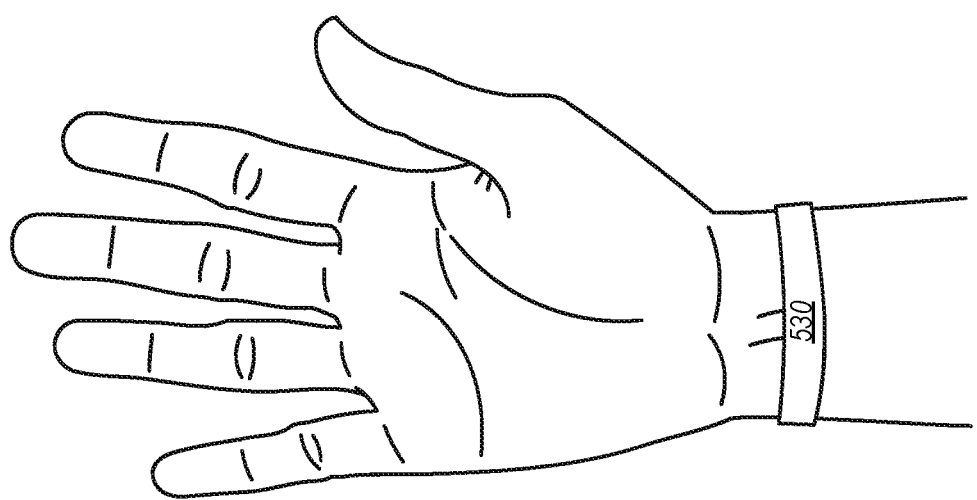

As shown in FIG. 5C, the wearable device may also be a bracelet 530 or a necklace 540. In some embodiments, the bracelet 530 and/or the necklace 540 may include the UI 515 and so may function in accordance with the wearable device 510. In other embodiments, however, the bracelet 530 and/or the necklace 540 may not be large enough to implement the UI 515. Accordingly, in such embodiments the bracelet 530 and/or the necklace 540 may function in accordance with the wearable device 520 and utilize the UI 301A of the user device 301.

Figure 6:
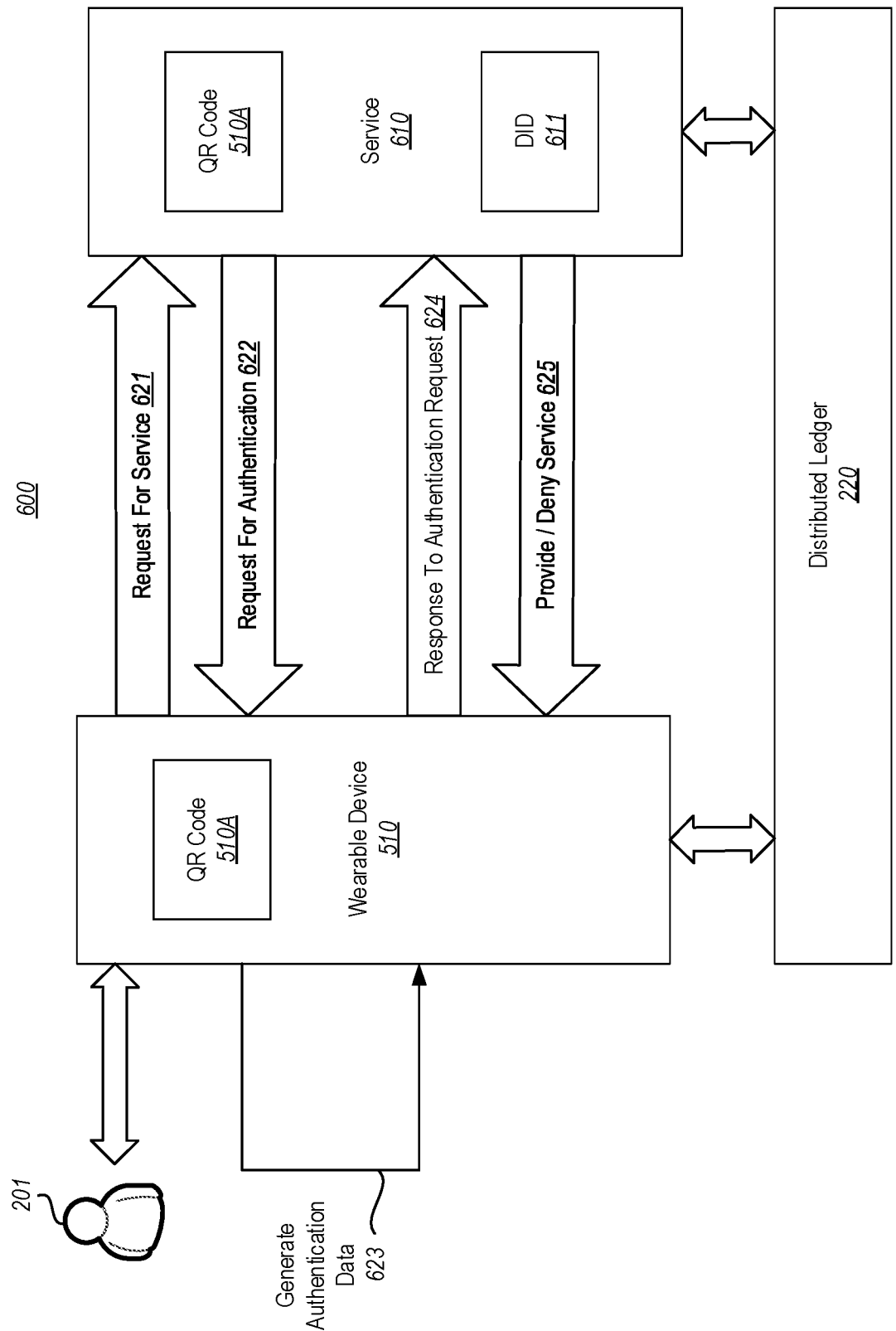
FIG. 6 illustrates an embodiment of a DID-related function.

FIG. 6 illustrates an embodiment 600 of a DID-related function for authenticating the identity of the DID owner 201 and that the DID owner 201 is authorized to use the DID 205. In the embodiment, the wearable device 510 communicates with a computing system of a service 610. Thus, the service 610 may be considered an example of a second computing system. As illustrated, the service 610 owns or is otherwise associated with a DID 611, which is created and propagated onto the distributed ledger 220 in the manner previously described.

In embodiment 600, the DID owner 201 is wearing the wearable device 510. The DID owner 201 first requests for a service from a service provider 610, which is represented by arrow 621. Such a request may be initiated via a website of the service 610. Alternatively, the request may be initiated by the DID owner 201 presenting to an interface of the service 610 a QR code 510A shown in the UI 515. In some embodiments, this may be done by having the DID owner 201 scan or wave the QR code 510A in front of the interface.

When the service provider 610 receives the request, the service provider 610 would want to know the identity of the DID owner 201 and also want to verify that the person who has initiated the request is truly associated with the identity being presented. As such, the service provider 610 requests the DID owner 201 to present his/her identity and to authenticate the identity being presented, which is represented by arrow 622. In some cases, if the service provider 610 has already received the DID 205 associated with the DID owner 201 from a previous interaction, the service provider 610 goes to the distributed ledger 220 to retrieve an authentication mechanism associated with the DID 205.

Receiving the request for authentication, the wearable device 510 will present the DID 205 and also generate authentication data based on the authentication request 622 and based on the authentication mechanism associated with the DID 205, which is represented by arrow 623. For example, as the authentication mechanism, a cryptographic signature will be generated by the wearable device 510. The cryptographic signature is encrypted by the private key 206 of the DID 205.

The generated authentication data is then sent to the service provider 610, which is represented by arrow 624. Receiving the authentication data, the service provider 610 will then validate the authentication data. For example, the service provider 610 will retrieve the public key 207 of the DID from the distributed ledger 220, and use the retrieved public key to try to decrypt the cryptographic signature. If the cryptographic signature is properly decrypted, the service provider 610 determines that the user's identity has been authenticated, otherwise, the user's identity is not authenticated.

In some embodiments, a hash of the public key 207 is propagated onto the distributed ledger 220. In such a case, the authentication data would not only include a cryptographic signature, but also include the public key 207. The service provider 610 will retrieve the hash recorded on the distributed ledger 220, use the received public key 207 to verify that the public key corresponds to the hash, and then use the received public key to verify that the cryptographic signature is valid.

Once the validation is completed, the service provider 610 will often provide or deny the service request of the DID owner 201, which is represented by arrow 625. For example, suppose the DID owner 201 is trying to access his/her cloud storage. When the DID owner 201's identity has been successfully validated, the service provider 610 will grant the user access to his/her cloud storage.

Figure 7A:
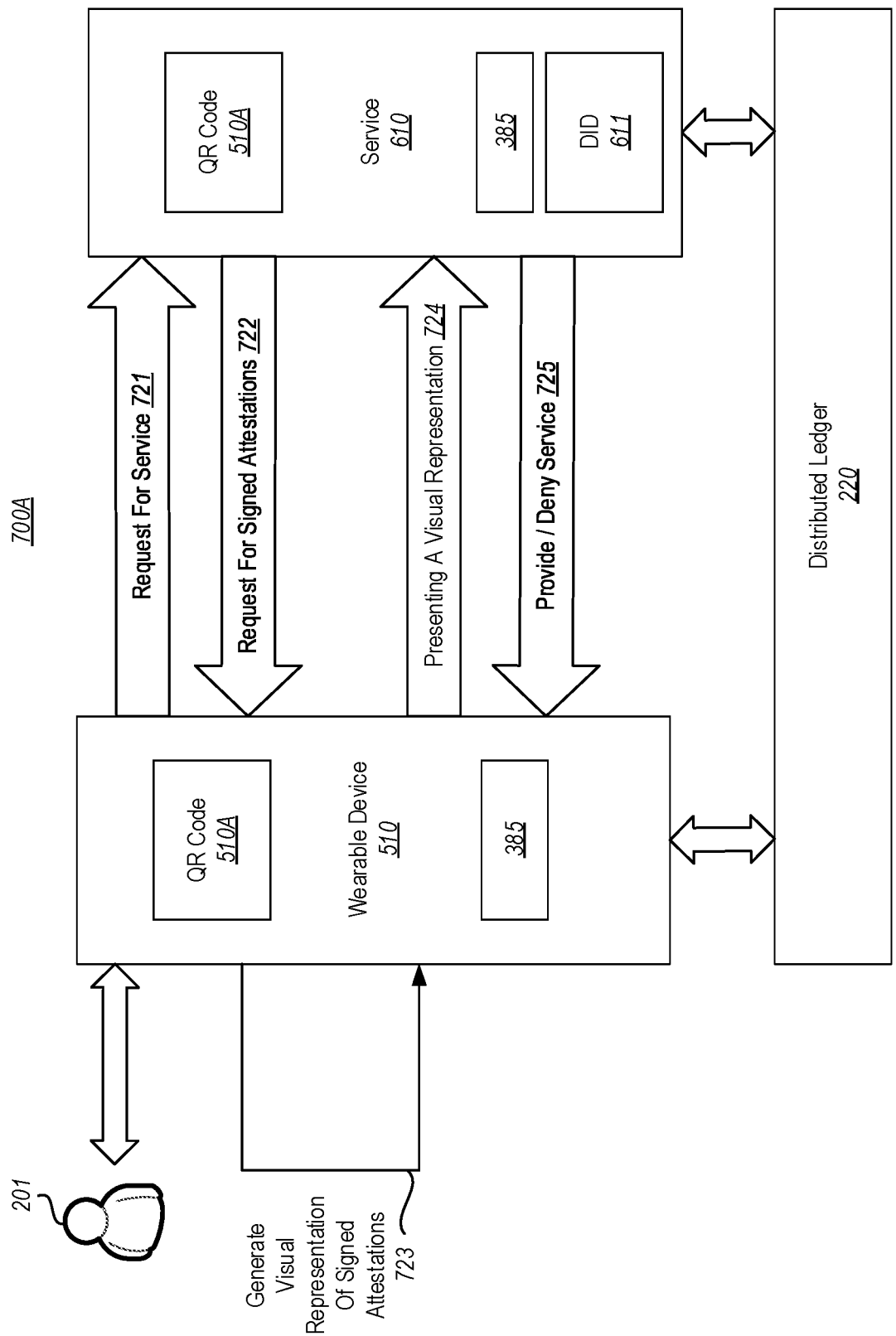
FIGS. 7A and 7B illustrate alternative embodiments of a DID-related function.

FIG. 7A illustrates an embodiment 700A of a DID-related function for presenting a visual representation of the DID 205 and one or more of the signed attestations 381A-381D so that the DID owner 201 is able to access a specific service provided by the service 610. In the embodiment, the wearable device 510 communicates with the computing system of the service 610 as described in relation to FIG. 6. As also described, the service 610 owns or is associated with the DID 611.

In embodiment 700A, the DID owner 201 is wearing the wearable device 510. The DID owner 201 first requests for a service from a service provider 610, which is represented by arrow 721. Such a request may be initiated via a website of the service 610. Alternatively, the request may be initiated by the DID owner 201 presenting to an interface of the service 610 a QR code 510A shown in the UI 515. In some embodiments, this may be done by having the DID owner 201 scan or wave the QR code 510A in front of the interface. In the illustrated embodiment, the service 610 is a car rental service and the request for service is a request to rent a car.

When the service provider 610 receives the request to rent a car, the service provider 610 wants to determine if the DID owner 201 has a valid driver's license issued by an appropriate government agency such as the Department of Motor Vehicles (DMV). As such, the service provider 610 requests the DID owner 201 to present a signed attestation from the DMV which verifies that the DID owner 201 has a valid driver's license, which is represented by arrow 722.

Receiving the request for the signed attestation, the wearable device 510 will generate the visual representation 385, which is represented by arrow 723. That is, the wearable device 510 will access the various signed attestations 381A-381D and find the signed attestation related to the driver's license, which in the embodiment is signed attestation 381A. As previously discussed in relation to FIG. 5A, the visual representation 385 shows the signed attestations (e.g., signed attestation 381A) and the DID 205 in a manner that is understandable to the service 610, for example an employee at the rental desk of the rental car agency. The visual representation 385 also includes the persona 386 of the DID owner 201, which in this case would likely include a name, address, and other real identifying information.

The visual representation 385 is then sent to the service provider 610, which is represented by arrow 724. Receiving the visual representation 385, the service provider 610 will then validate the signed attestation 381A to ensure that the driver's license is still valid. For example, the service provider 610 may use information included in the signed attestation 381A to reach out to the DMV to determine the validity of the signed attestation 381A.

Once the validation is completed, the service provider 610 will provide or deny the service request of the DID owner 201, which is represented by arrow 725. For example, if the driver's license is still valid, then the car rental agency will rent a car to the DID owner 201. However, if the driver's license is not valid, then the car will not be rented.

Figure 7B:
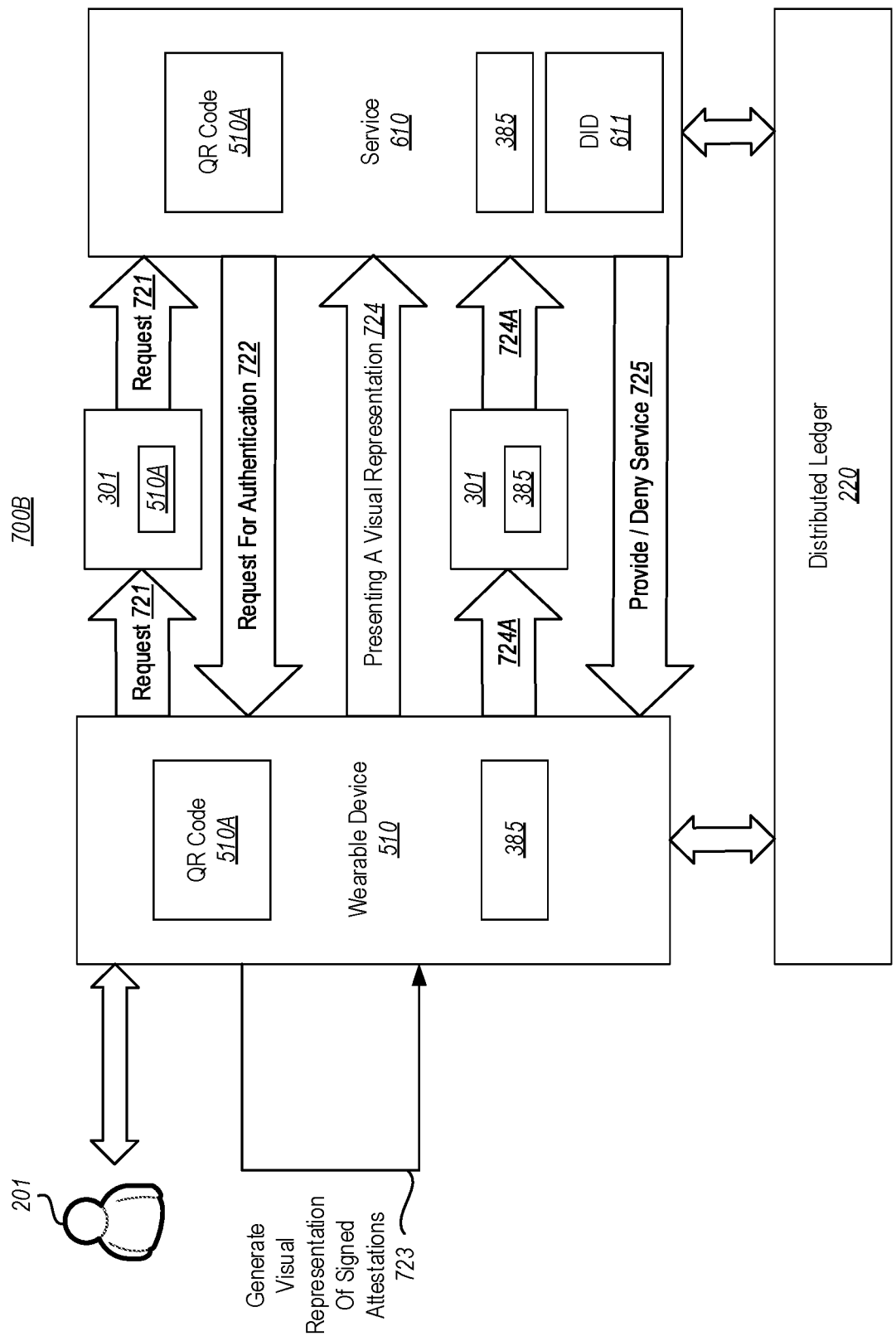

FIG. 7B illustrates an alternative embodiment 700B, that is an alternative of the embodiment 700A of FIG. 7A, of a DID-related function for presenting a visual representation of the DID 205 and one or more of the signed attestations 381A-381D so that the DID owner 201 is able to access a specific service provided by the service 610. In the embodiment, the wearable device 520 communicates with the computing system of the service 610 as described in relation to FIG. 6. As also described, the service 610 owns or is associated with the DID 611.

In embodiment 700B, the DID owner 201 is wearing the wearable device 520. The DID owner 201 first requests for a service from the service provider 610, which is represented by arrow 721. Such a request may be initiated by the DID owner 201 presenting to an interface of the service 610 a QR code 510A. As discussed above, the wearable device 520 does not include UI 515, but rather implements the UI 301A of the user device 301. Accordingly, the request 721 and QR code 510A are first received by the user device 301. The DID owner 201 is then able to scan or wave the QR code 510A shown in the UI 301A in front of the interface. In the illustrated embodiment, the service 610 is a car rental service and the request for service is a request to rent a car.

When the service provider 610 receives the request to rent a car, the service provider 610 wants to determine if the DID owner 201 has a valid driver's license issued by an appropriate government agency such as the Department of Motor Vehicles (DMV). As such, the service provider 610 requests the DID owner 201 to present a signed attestation from the DMV which verifies that the DID owner 201 has a valid driver's license, which is represented by arrow 722.

Receiving the request for the signed attestation, the wearable device 510 will generate the visual representation 385, which is represented by arrow 723. That is, the wearable device 510 will access the various signed attestations 381A-381D and find the signed attestation related to the driver's license, which in the embodiment is signed attestation 381A. As previously discussed in relation to FIG. 5A, the visual representation 385 shows the signed attestations (e.g., signed attestation 381A) and the DID 205 in a manner that is understandable to the service 610, for example an employee at the rental desk of the rental car agency. The visual representation 385 also includes the persona 386 of the DID owner 201, which in this case would likely include a name, address, and other real identifying information.

The visual representation 385 is then sent to the service provider 610, which is represented by arrow 724. Receiving the visual representation 385, the service provider 610 will then validate the signed attestation 381A to ensure that the driver's license is still valid. For example, the service provider 610 may use information included in the signed attestation 381A to reach out to the DMV to determine the validity of the signed attestation 381A.

In some embodiments, as represented by arrow 724A, the visual representation 385 is also shown in the UI 301A of the user device 301. This allows the DID owner 201 to visually show the visual representation 385 to an employee of the rental car agency, for example an employee at the rental desk of the rental car agency.

Once the validation is completed, the service provider 610 will provide or deny the service request of the DID owner 201, which is represented by arrow 725. For example, if the driver's license is still valid, then the car rental agency will rent a car to the DID owner 201. However, if the driver's license is not valid, then the car will not be rented.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
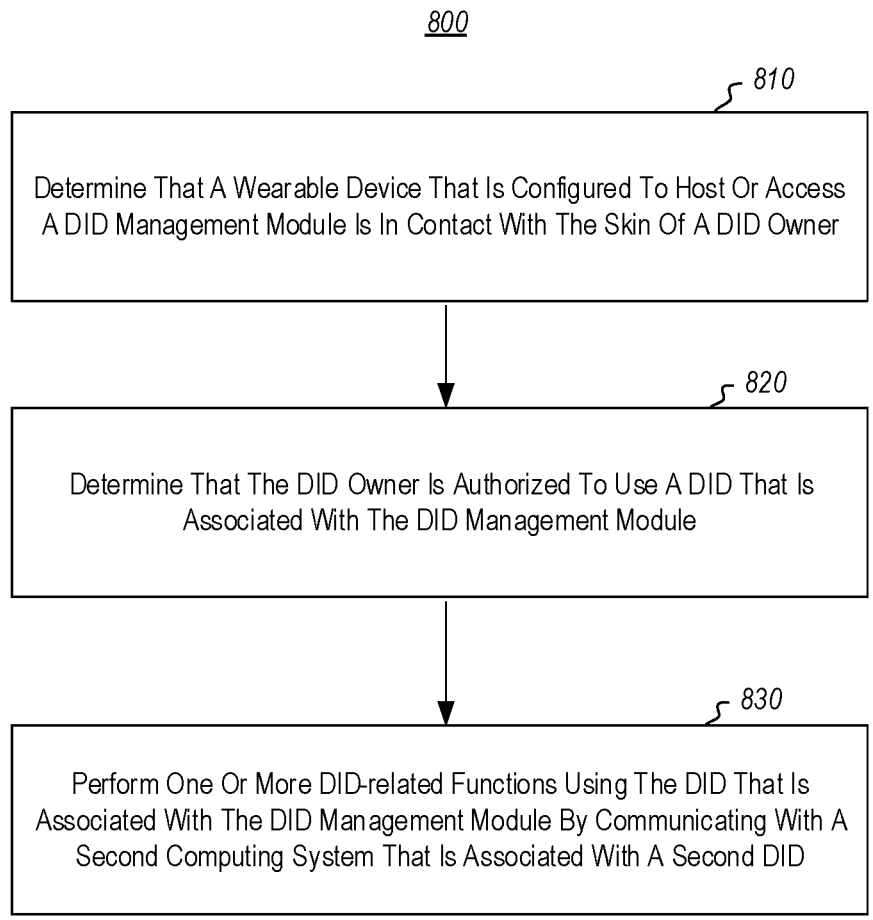
FIG. 8 illustrates a flow chart of an example method for implementing one or more DID related functions using a wearable device that allows a user to access or control a DID management module associated with a DID of a user in a portable and secure manner.

FIG. 8 illustrates a flow chart of an example method 800 for implementing one or more DID related functions using a wearable device that allows a user to access or control a DID management module associated with a DID of a user in a portable and secure manner. The method 800 will be described with respect to one or more of FIGS. 2-7 discussed previously.

The method 800 includes determining that a wearable device that is configured to host or access a DID management module is in contact with the skin of a DID owner (810). For example, as previously discussed the wearable devices 510, 520, 530, and 540 are configured to host or access the DID management module 320 that is associated with the DID 205 of the DID owner 201. The contact sensor 513 determines if the wearable device is in contact with the skin of the DID owner 201.

The method 800 incudes determining that the DID owner is authorized to use a DID that is associated with the DID management module (820). For example, as previously discussed the DID owner 201 enters a username and password or enters biometric information that verifies that the DID owner 201 is authorized to use the DID 205 in various DID-related functions.

The method 800 includes performing one or more DID-related functions using the DID that is associated with the DID management module by communicating with a second computing system that is associated with a second DID, the wearable device allowing the one or more DID-related functions to be performed in a portable and secure manner (830). For example, as previously described the wearable device allows the DID owner 201 to perform various DID-related functions such as those discussed in FIGS. 6, 7A, and 7B. The wearable device communicates with the computing system of the service provider 610 that is associated with the DID 611.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, the computing system implementing one or more DID related functions using a wearable device that allows a user to access or control a DID management module associated with a DID of the user in a portable and secure manner, the computing system comprising:
    one or more processors; and
    one or more computer-readable media having thereon computer-executable instructions that are structured such that, when executed by the one or more processors, cause the computing system to:
    determine that a wearable device that is configured to host or access a DID management module is in contact with the skin of a DID owner;
    determine that the DID owner is authorized to use a DID that is associated with the DID management module; and
    perform one or more DID-related functions using the DID that is associated with the DID management module by communicating with a second computing system that is associated with a second DID, the wearable device allowing the one or more DID-related functions to be performed in a portable and secure manner.

2. The computing system in accordance with claim 1, wherein the wearable device is one of a watch, a ring, a bracelet or a necklace.

3. The computing system in accordance with claim 1, wherein the computer-executable instructions are structured to further cause the computing system to:
    shut off the wearable device when it is determined that the skin of the DID owner is no longer in contact with the wearable device.

4. The computing system in accordance with claim 1, wherein the computing system is the wearable device.

5. The computing system in accordance with claim 1, wherein performing one or more DID-related functions comprises:
    accessing one or more signed attestations that include information about the DID owner; and
    providing the one or more signed attestations to the second computing system as a visual representation of the one or more attestations.

6. The computing system in accordance with claim 1, wherein performing one or more functions comprises:
    presenting to an interface of the second computing system a QR code; and
    providing a visual representation of the DID associated with the management module.

7. The computing system in accordance with claim 6, wherein the QR code is presented to the second computing system by a third computing system.

8. The computing system in accordance with claim 6, wherein the visual representation is viewable on the third computing system.

9. The computing system in accordance with claim 1, wherein performing one or more functions comprises:
    providing a request for a service to the second computing system;
    receiving a request for authentication data; and
    providing the authentication data to the second computing system.

10. The computing system in accordance with claim 1, wherein determining that the DID owner is authorized to use a DID comprises:
    receiving information that identifies the DID owner.

11. The computing system in accordance with claim 10, wherein the information is one of a username and password or biometric information.

12. The computing system in accordance with claim 10, wherein the information that identifies the user is received from a third computing system.

13. A wearable device that is implemented in a decentralized network that implements a distributed ledger, the distributed ledger being configured to back one or more decentralized identities (DID) for one or more users of the wearable device, the wearable device implementing one or more DID related functions that allows a user to access or control a DID management module associated with a DID of the user in a portable and secure manner, the wearable device comprising:
    a contact sensor;
    one or more processors; and
    one or more computer-readable media having thereon computer-executable instructions that are structured such that, when executed by the one or more processors, cause the wearable device to:
    use the contact sensor to determine that the wearable device is in contact with the skin of a DID owner, the wearable device being configured to host or access a DID management module;
    determine that the DID owner is authorized to use a DID that is associated with the DID management module; and
    perform one or more functions using the DID that is associated with the DID management module by communicating with a second computing system that is associated with a second DID, the wearable device allowing the one or more DID-related functions to be performed in a portable and secure manner.

14. The wearable device in accordance with claim 13, wherein the wearable device is one of a watch, a ring, a bracelet or a necklace.

15. The wearable device in accordance with claim 13, wherein the computer-executable instructions are structured to further cause the wearable device to:
   shut off the wearable device when the contact sensor determines that the skin of the DID owner is no longer in contact with the wearable device.

16. The wearable device in accordance with claim 13, wherein performing one or more functions comprises:
   accessing one or more signed attestations that include information about the DID owner; and
   providing the one or more signed attestations to the second computing system as a visual representation of the one or more attestations.

17. The wearable device in accordance with claim 13, wherein performing one or more functions comprises:
   presenting to an interface of the second computing system a QR code; and
   providing a visual representation of the DID associated with the management module.

18. The wearable device in accordance with claim 13, further comprising a biometric sensor, the biometric sensor used to make biometric readings of the DID owner.

19. A method for implementing one or more DID related functions using a wearable device that allows a user to access or control a DID management module associated with a DID of a user in a portable and secure manner, the computing system comprising:
   determining that a wearable device that is configured to host or access a DID management module is in contact with the skin of a DID owner;
   determining that the DID owner is authorized to use a DID that is associated with the DID management module; and
   performing one or more DID-related functions using the DID that is associated with the DID management module by communicating with a second computing system that is associated with a second DID, the wearable device allowing the one or more DID-related functions to be performed in a portable and secure manner.

20. The method in accordance with claim 18, wherein the wearable device is one of a watch, a ring, a bracelet or a necklace.

\* \* \* \* \*